(12) United States Patent  
Chisholm et al.

(10) Patent No.: US 7,959,805 B2  
(45) Date of Patent: Jun. 14, 2011

(54) MANIFOLD ADAPTOR PLATE FOR FILTRATION APPARATUS

(75) Inventors: Mark Chisholm, Arlington, MA (US); Stephen J. Dzengeleski, Arlington, MA (US); Tom Janko, Medford, MA (US); James E. Kelly, Jr., Melrose, MA (US); Ralph Stankowski, Westford, MA (US)

(73) Assignee: Millipore Corporation, Billerica, MA (US)

(*) Notice: Subject to any disclaimer, the term of this patent is extended or adjusted under 35 U.S.C. 154(b) by 477 days.

(21) Appl. No.: 11/825,746

(22) Filed: Jul. 9, 2007

(65) Prior Publication Data

US 2008/0029451 A1 Feb. 7, 2008

Related U.S. Application Data

(60) Provisional application No. 60/927,058, filed on May 1, 2007, provisional application No. 60/833,891, filed on Jul. 28, 2006.

(51) Int. Cl.  
*B01D 63/00* (2006.01)  
*B01D 29/01* (2006.01)  
*B01D 61/00* (2006.01)

(52) U.S. Cl. ........... 210/321.6; 210/321.72; 210/488; 210/490; 204/627; 204/630

(58) Field of Classification Search .................. None  
See application file for complete search history.

(56) References Cited

U.S. PATENT DOCUMENTS

| | | | | |
|---|---|---|---|---|
| 3,661,721 A | * | 5/1972 | Rodgers | ............... 202/172 |
| 4,624,784 A | * | 11/1986 | Lefebvre | ............ 210/321.67 |
| 5,176,828 A | | 1/1993 | Proulx | |
| 5,597,447 A | | 1/1997 | Hank et al. | |
| 2002/0139741 A1 | * | 10/2002 | Kopf, III | ............... 210/224 |
| 2003/0052054 A1 | * | 3/2003 | Pearl et al. | ........... 210/500.21 |
| 2003/0192783 A1 | | 10/2003 | Liang et al. | |
| 2003/0196947 A1 | | 10/2003 | Gundrum et al. | |

FOREIGN PATENT DOCUMENTS

| | | |
|---|---|---|
| CN | 1652863 A | 8/2005 |
| DE | 21 64 284 | 7/1972 |
| DE | 4330840 C1 | 2/1995 |
| GB | 1381681 A | 1/1975 |
| JP | 53-103983 A | 9/1978 |
| JP | 06-114213 A | 4/1994 |
| JP | 2002-518169 A | 6/2002 |
| WO | WO 91/11248 | 8/1991 |
| WO | WO 00/78429 | 12/2000 |
| WO | WO 02/076592 | 10/2002 |
| WO | 03/002229 A1 | 1/2003 |

OTHER PUBLICATIONS

European Search Report, EP 07112936.5, Nov. 26, 2007.  
Extended European Search Report received for EP Patent Application No. 10178438.7, mailed on Nov. 5, 2010, 6 pages.  
Extended European Search Report received for EP Patent Application No. 10179130.9, mailed on Nov. 17, 2010, 6 pages.

* cited by examiner

*Primary Examiner* — Krishnan S Menon

(57) ABSTRACT

A manifold adaptor plate useful as a gasket having liquid pathways which permit passing of a filtrate, a feed and a retentate wherein admixture of the filtrate with the feed or the retentate is prevented is provided and is formed of an elastomeric layer, a rigid intermediate layer and a polymer layer. The elastomeric layer functions as a gasket and is bonded to the polymeric layer through the liquid pathways of the intermediate plate. An elastomer layer may be formed on both layers as well and optionally a second polymer layer between the intermediate layer and the second elastomer layer may also be used.

21 Claims, 8 Drawing Sheets

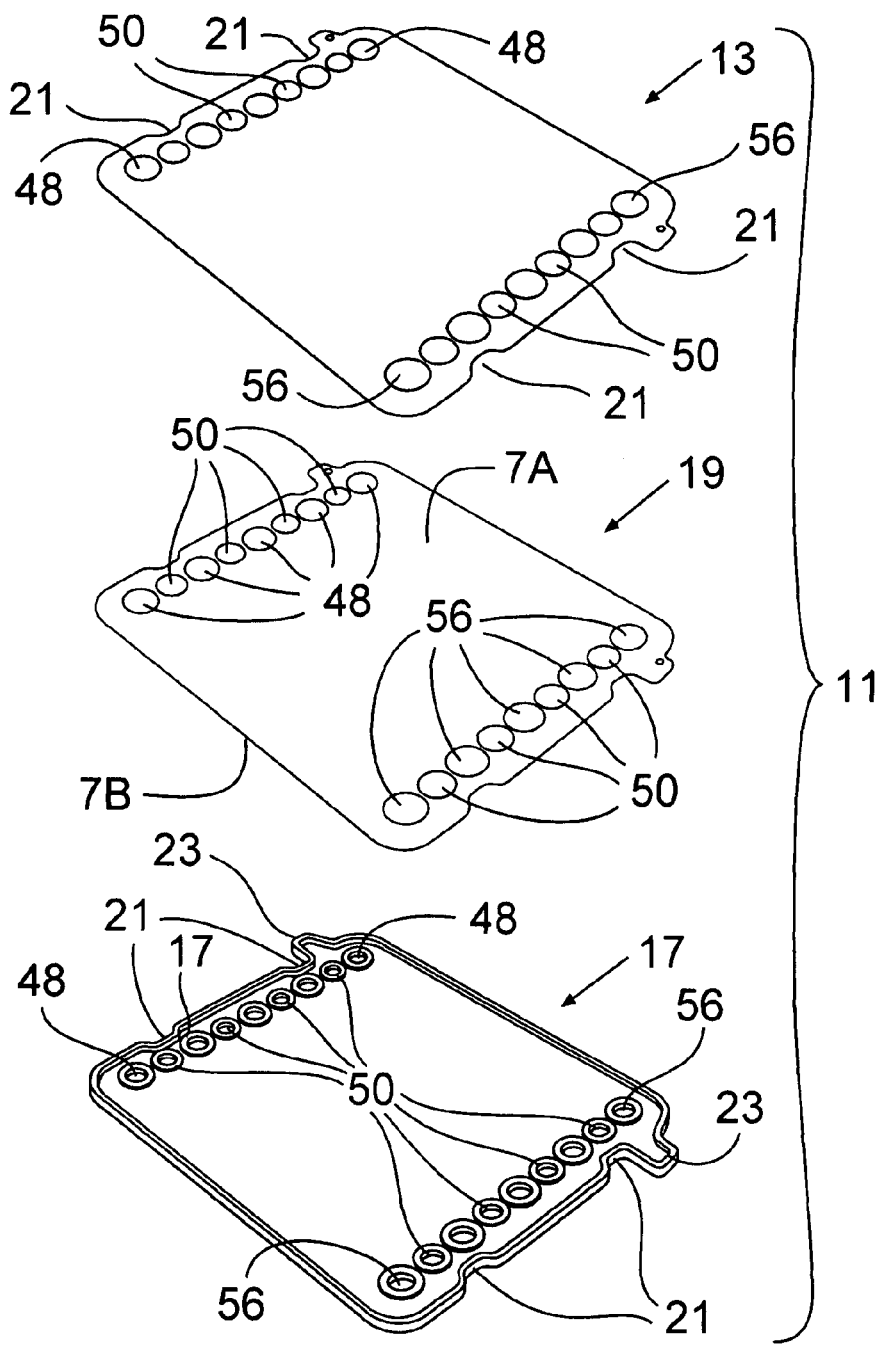
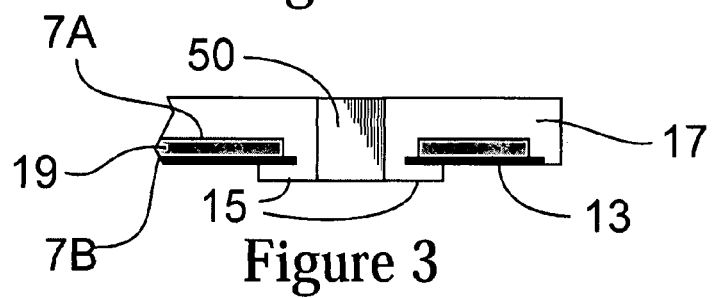
Figure 2
Figure 3

MANIFOLD ADAPTOR PLATE FOR FILTRATION APPARATUS

CROSS REFERENCE TO RELATED APPLICATIONS

The present patent application claims the benefit of U.S. Provisional Patent Application No. 60/927,058, filed on May 1, 2007 and claims the benefit of U.S. Provisional Patent Application No. 60/833,891 filed on Jul. 28, 2006 both of which are hereby incorporated by reference in their entirety.

BACKGROUND OF THE INVENTION

The present invention relates to a manifold adaptor plate that functions as a gasket utilized to separate filtrate from feed and retentate in a tangential flow filtration apparatus. More particularly, this invention relates to such a manifold adaptor plate of unitary construction having a plurality of layers including one or two sealing layers and an intermediate rigid support layer.

Prior to the present invention, liquids, primarily aqueous liquids, have been filtered by tangential flow modules wherein a plurality of filters are stacked between two manifolds, one at the bottom of the stack and one at the top of the stack. The filtration module stack comprises a collection of one or more filtration modules and associated intermodule gaskets. The filters are separated by appropriate screens and liquid-impervious layers to permit liquid flow as well as filtrate and retentate flow into and from the stack. In addition, flow holes are provided through the layers within the stack. The holes are sealed appropriately with a separate sheet of gasketing material to prevent admixture of filtrate with incoming liquid feed or retentate. The manifolds in each segment are designed so that filtrate is removed from the second manifold. This manifold arrangement necessitates fittings to both manifolds in order to supply and remove liquid to and from manifolds in order to supply and remove liquid to and from the stack. This can be undesirable since additional manipulative steps for removing and connecting the fittings are required when it is desirable to replace the filtration elements forming the stack.

Alternative tangential flow modules are disclosed in U.S. Pat. Nos. 5,176,828 and 5,597,447 wherein a single manifold is utilized at one end of each stack of filters and a plate is positioned at the opposite end of each stack of filters. Liquid flow paths are provided to assure that filtrate is not contaminated with either retentate or feed.

In the tangential flow modules described above, a separate sheet of gasket material is positioned between the one or two manifolds and the stack of filters to assure the desired liquid flow. The gasket sheet, is used with manifold adaptor plate consists of a metal plate. The elastomeric gasket sheet, such as silicone, can be placed against each surface of the metal plate to provide desired sealing. The metal plate and elastomeric gasket sheets are provided with liquid flow paths to assure the desired liquid flow to, within and from the tangential flow module.

The use of a manifold adaptor plate having a separate elastomeric sheet layer is undesirable, since, due to its flexibility, it is difficult to properly align the liquid flow paths through the elastomeric layer with the liquid inlets and liquid outlets of the manifold. In some instances it is possible to deform the gasket sheet during application in such a manner to allow for the improper mixing of fluids. In addition, the elastomeric layer tends to stick to the manifold causing wrinkling that adversely affects uniform and complete contact with the manifold surface. This condition can lead to external leaks as well as imperfect alignment of liquid flow paths that can cause cross contamination of flowing liquids. In addition, when the elastomeric gaskets are compressed during use of the module, they tend to move which can cause significant liquid inlet and liquid outlet distortion. The separate sheet is generally formed of silicone which has relatively high extractables that can be adding to the fluid that passes through it. These extractables need to either be removed from the fluid before use or to be tested to ensure they don't contaminate or otherwise cause an adverse reaction in the final product, particularly when it is a drug or therapeutic protein. Lastly, the gasket sheet being a relatively weak and unsupported structure formed of relatively low durometer silicone or rubber, it can tear during handling and storage rendering it useless and they can distort enough to cause an external leak as well.

Accordingly, it would be desirable to provide a manifold adaptor plate which provides satisfactory sealing without the liquid flow path alignment or handling problems of the prior art.

SUMMARY OF THE INVENTION

The present invention provides a manifold adaptor plate comprising a rigid plate layer, a polymeric sheet layer and one or two elastomeric layers. Each layer is provided with holes which permit passage therethrough of liquid feed, filtrate and retentate without mixing of filtrate with either retentate or feed. When utilizing one elastomeric layer, it is molded onto a first surface of the rigid plate layer and through all of the holes of each layer so that it is bound to a portion of the area on the polymeric sheet surrounding the holes through the polymeric sheet that is contact with the opposite or second surface of the rigid plate. By effecting binding of the polymeric sheet to the elastomeric layer, the elastomeric layer is provided with a rigid support by the rigid plate layer and the elastomeric layer does not move relative to the rigid plate layer. By providing rigid support to the elastomeric layer, it can be properly and easily positioned in contact with a manifold to effect desired sealing. In an alternative embodiment of this invention, two elastomeric layers are utilized, one in contact with a first surface of the rigid plate layer and the second in contact with the polymeric sheet which is in contact with the second opposite surface of the rigid plate. The elastomeric layers are bound to each other through holes formed in the rigid plate layer and the polymeric sheet. This embodiment provides two sealing layers which can be utilized to seal a manifold or a filtration module to prevent admixture of filtrate with either feed or retentate. The plate can be used between two devices.

In a further alternative embodiment of this invention, the elastomeric layer is silicone-based and the polymeric layer is optionally eliminated. In one example of this embodiment, when the rigid plate is made of steel, preferably stainless steel, or a plastic to which silicone adheres such as polysulfones or polyethersulfones, at least a portion of one side of the rigid plate is coated with the silicone and the silicone also extends through the holes formed in the rigid plate to the opposite face. Alternatively, at least one entire side or both sides of the rigid plate (which can be steel or a plastic to which silicone adheres as well as any other material suggested previously for the rigid plate) are coated with silicone without the need for the polymeric layer and the silicone layers are bound to each other through holes formed in the rigid plate layer. Further, if desired one can use a polymeric sheet is desired.

In another embodiment, one or more of the holes of the plate may be filled by the elastomeric material to act as a flow diverter.

The elastomeric sheets are sufficiently flexible that they can effect sealing of a manifold or filtration module in contact with the elastomeric sheet to prevent admixture of filtrate with feed or retentate flowing within the manifold of filtration module. Preferably, they are made of thermoplastic elastomers which have low levels of extractables.

BRIEF DESCRIPTION OF THE DRAWINGS

FIG. 2 is an exploded view of the manifold adaptor plate of this invention.

FIG. 3 is a cross sectional view of a portion of the manifold adaptor plate of FIG. 2.

DESCRIPTION OF SPECIFIC EMBODIMENTS

Figure 1:
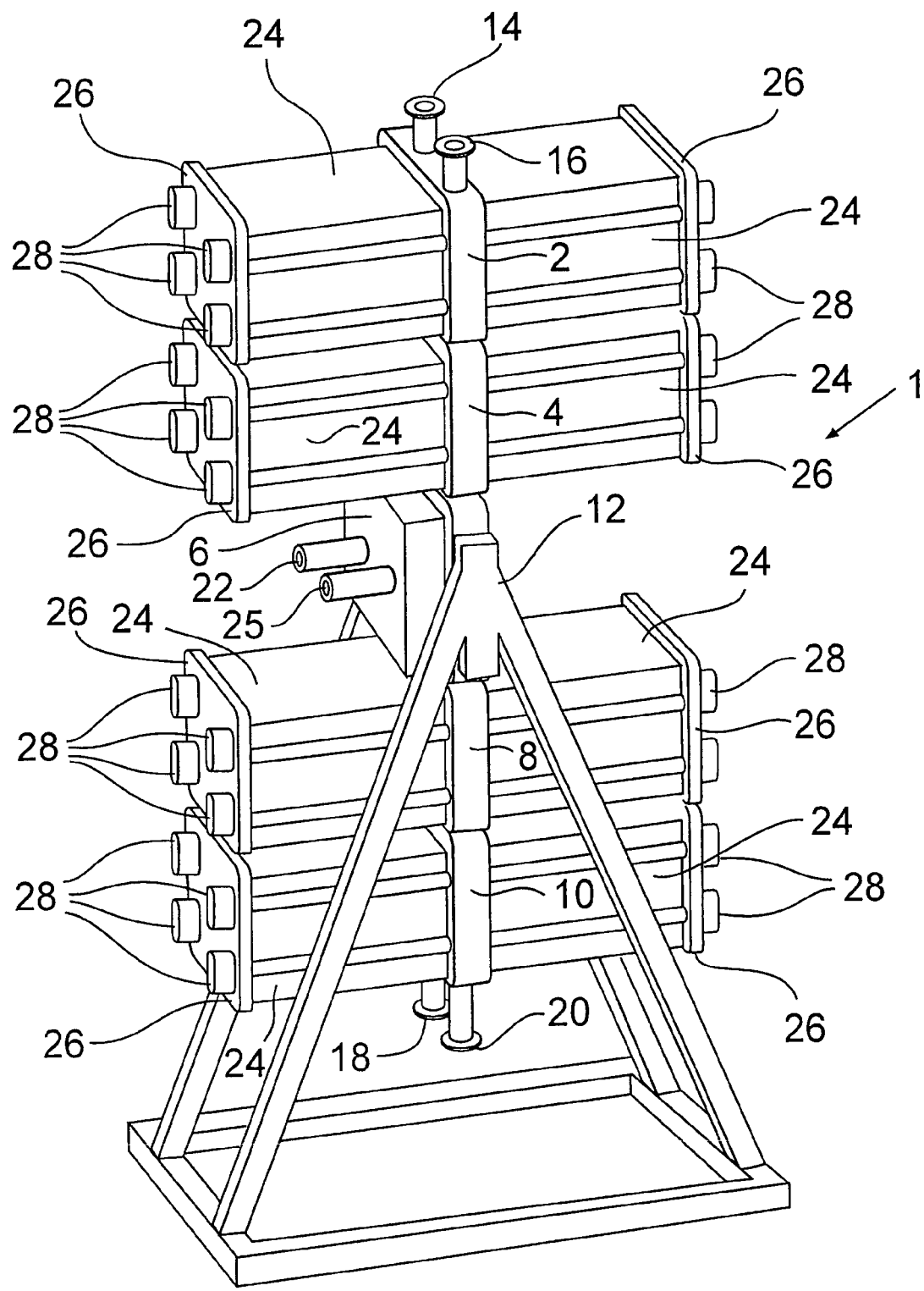
FIG. 1 is an isometric view of the manifold apparatus of this invention in use.

Referring to FIG. 1, a manifold apparatus 1 within which the manifold adaptor plate of this invention can be incorporated includes a first set of manifold segments 2 and 4, connected together; a feed manifold segment 6 and a second set of manifold segments 8 and 10 connected together and mounted on manifold frame 12. The first set of manifold segments 2 and 4 is provided with a filtrate outlet 14 and a retentate vent 16. The second set of manifold segments 8 and 10 is provided with a filtrate outlet 18 and a retentate drain 20. The retentate drain 20 and retentate vent 16 are capped during filtration. The retentate vent 16 permits filling the retentate flow path with liquid and the retentate drain permits draining the apparatus of retentate upon completion of the filtration. The feed segment 6 is provided with a feed inlet 22 and a retentate outlet 25. The feed inlet can have a diameter larger than that of internal feed conduits within the manifold segments since the incoming feed is split into the first set of manifold segments 2 and 4 and the second set of segments 8 and 10. A plurality of filtration modules 24 are secured to manifold segments 2, 4, 8 and 10 by means of a plates 26 and a plurality of compression assemblies 28 such as bolts. Alternatively, threaded rods having nuts on their ends can be utilized rather than bolts. The manifold adaptor plate 11 (FIG. 6) of this invention is positioned between the filtration modules 24 and the manifold segments 2, 4, 8 and 10.

Referring to FIGS. 2 and 3 manifold adaptor plate 11 of this invention consists of polymeric sheet 13, a rigid plate 19 that can be formed of a thermosetting resin, reinforced composites such as graphite or carbon composites or a metal such as stainless steel, Hastolloy metal or aluminum and an elastomeric layer 17. The rigid plate 19 has two major surfaces, 7A and 7B, respectively. The polymeric sheet is arranged to be in contact with one major surface of the rigid plate, in the instance of FIGS. 2 and 3 with the first major surface 7A while the elastomeric layer 17 is arranged to be in contact with the other major surface that is opposite the first surface, in the instance of FIGS. 2 and 3 with the second major surface 7B. Each layer 13, 17 and 19 is provided with holes to effect desired liquid flow through the plate 11. The holes of each layer 13, 17, 19 are in line and in register with each other to ensure proper flow and sealing in the fluid pathway and to ensure proper bonding of the elastomeric layer to the polymeric layer. Each layer 13, 17 and 19 have one edge with alternating holes 50 for filtrate with hole 56 for retentate. The opposing edge is provided with holes 48 for feed which alternate with holes 50 for filtrate. As shown in FIG. 3 which is a close up of the assembled plate 11 shown through one hole, in this case hole 50, the elastomeric layer 17 extends through each hole 48, 50 and 56 to form protrusions 15 that extend over and bind to polymeric sheet 13. Preferably, the manifold adaptor plate 11 is provided with four indentations 21 which permit the plate 11 to be hung on bolts 28 (FIG. 1), however this is not required and other means can used instead. Tabs 23 can also be provided to facilitate assembly of plate 11 onto bolts 28 and removed of the plate 11 from bolts 28.

The elastomeric layer 17 and polymeric sheet 13 are matched so that the two layers are bound to each other when the elastomeric layer 17 is molded. Optionally, the elastomeric layer can be bonded to the surface of the rigid plate against which it is applied. As optionally, the polymeric sheet instead of being a separate layer can be cast or otherwise formed on the surface of the rigid plate against which it is applied. The seal is formed of any elastomeric material. The elastomeric material does not need to be very elastic but it should have some ability to maintain the seal with the adjacent layers during flexion or compression. Preferably it has a durometer of from about 60 to about 100 Shore A.

Suitable materials include but are not limited to thermoplastics, such as polyethylene, polypropylene, EVA copolymers, alpha olefins and metallocene copolymers, PFA, MFA, polycarbonate, vinyl copolymers such as PVC, polyamides such as nylon, polyesters, acrylonitrile-butadienestyrene (ABS), polysulphone, polyethersulphone, polyarylsulphone, polyphenylsulphone, polyacrylonitrile, polyvinylidene fluoride (PVDF), and blends thereof, thermoplastic elastomers which can be formed of styrenic block copolymers, blends of EPDM and polypropylene and the like and which are sold under brand names such as Santoprene® polymer, Kraton® thermoplastic elastomer and Dynaflex® elastomer, EPDM rubber, thermosets such as closed cell foamed urethanes, and rubbers, either natural or synthetic.

It is preferred that the material be a thermoplastic or thermoplastic elastomer so as to allow for its use in the preferred method of this invention, injection molding. Additional, thermoplastics and thermoplastic elastomers have lower levels of extractables making the filtered product cleaner. Exemplary preferred material include SANTOPRENE® polymer with a durometer of about 80 available from Advanced Elastomer Systems of Akron, Ohio or the thermoplastic elastomer Kraton® elastomer G27052 with a Shore A hardness of 56, available from Advanced Elastomer Systems located at Akron Ohio. Preferred thermoplastics include low density, linear low density, medium density and high density polyethylene, polypropylene and EVA copolymers.

Representative suitable polymeric sheets include polypropylene, polyethelyne, polyester, polysulfone, polyamide, acetal, acrylic, polystyrene, PTFE, silicone, vinyl or the like, representative suitable rigid layers include stainless steel, steel, aluminum, phenol-formaldehyde, urea-formaldehyde, carbon/epoxy composites, graphite/epoxy composites, rigid molded plastic, glass or fiber filled plastic or the like.

Figure 4:
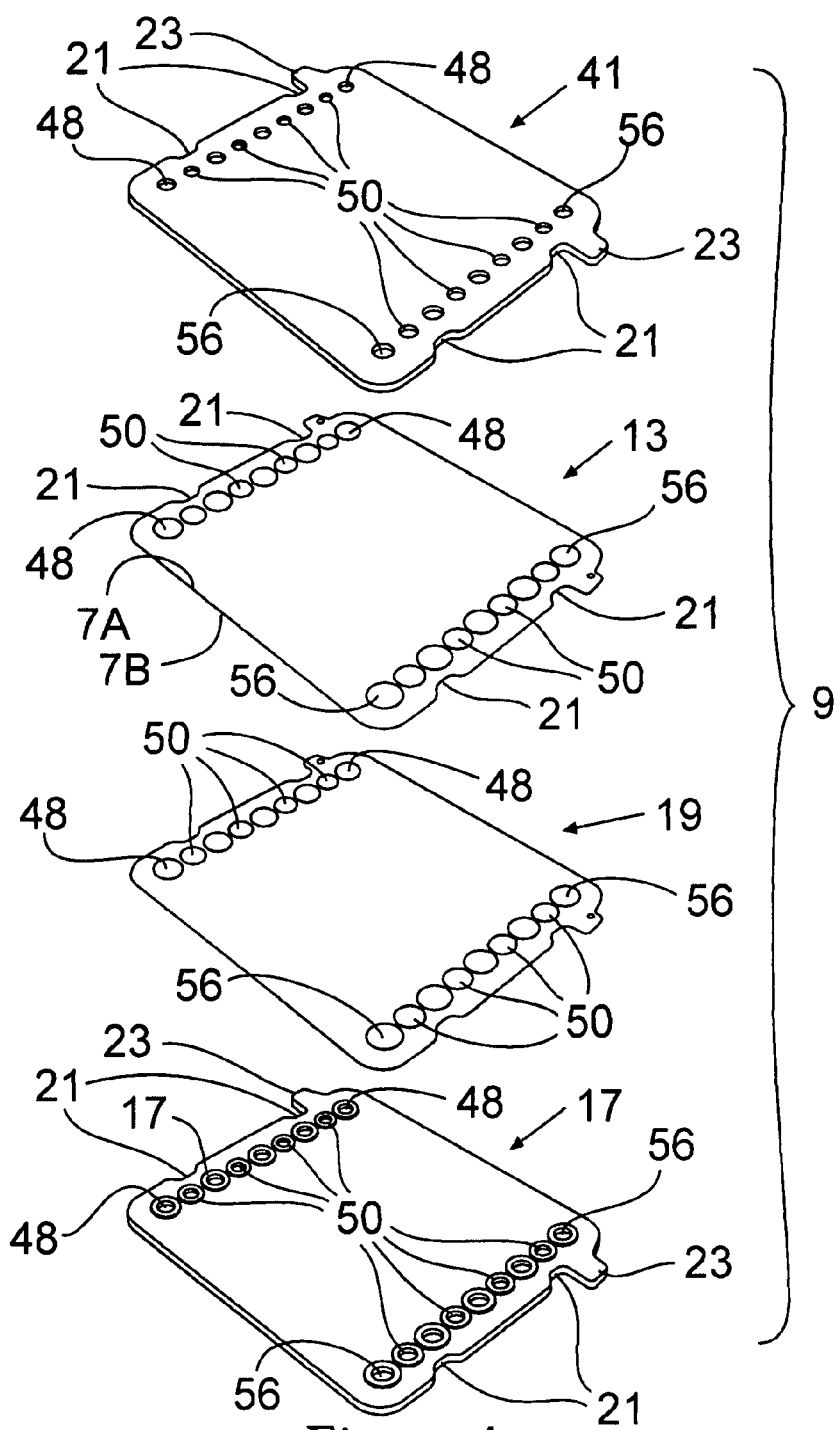
FIG. 4 is an exploded view of an alternative manifold adaptor plate of this invention.
Figure 5:
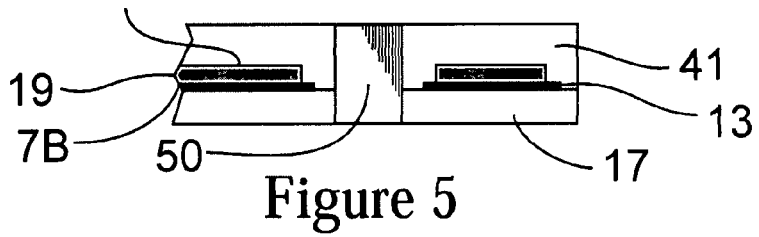
FIG. 5 is a partial cross sectional view of the manifold adaptor of FIG. 4.

Referring to FIGS. 4 and 5, the alternative manifold adaptor plate 9 of this invention includes two elastomeric layers 17 and 41, polymeric sheet 13 and rigid plate 19. The polymeric sheet 13 is optional since the elastomeric layers 17 and 41 bind to each other through the holes 48, 50 and 56. The optional polymeric sheet can be positioned on both surfaces 7A and 7B of rigid plate 19 as well as on only one surface 7A of plate 19 as shown in FIG. 4. Like reference numbers in FIGS. 4 and 5 refer to like elements of FIGS. 2 and 3. As shown in FIG. 5, elastomeric layer 41 coats polymeric sheet 13 and elastomeric layer 17 coats polymeric sheet 13. In addition, elastomeric layers 17 and 41 are bound to each other within holes 50 as well as within holes 48 and 56. This embodiment of this invention provides two gasket sealing surfaces. The sealing surfaces on the elastomeric surfaces can be flat (layer 41, FIG. 4) or can comprise protrusions (protrusions 15, FIGS. 2 and 3).

Figure 6:
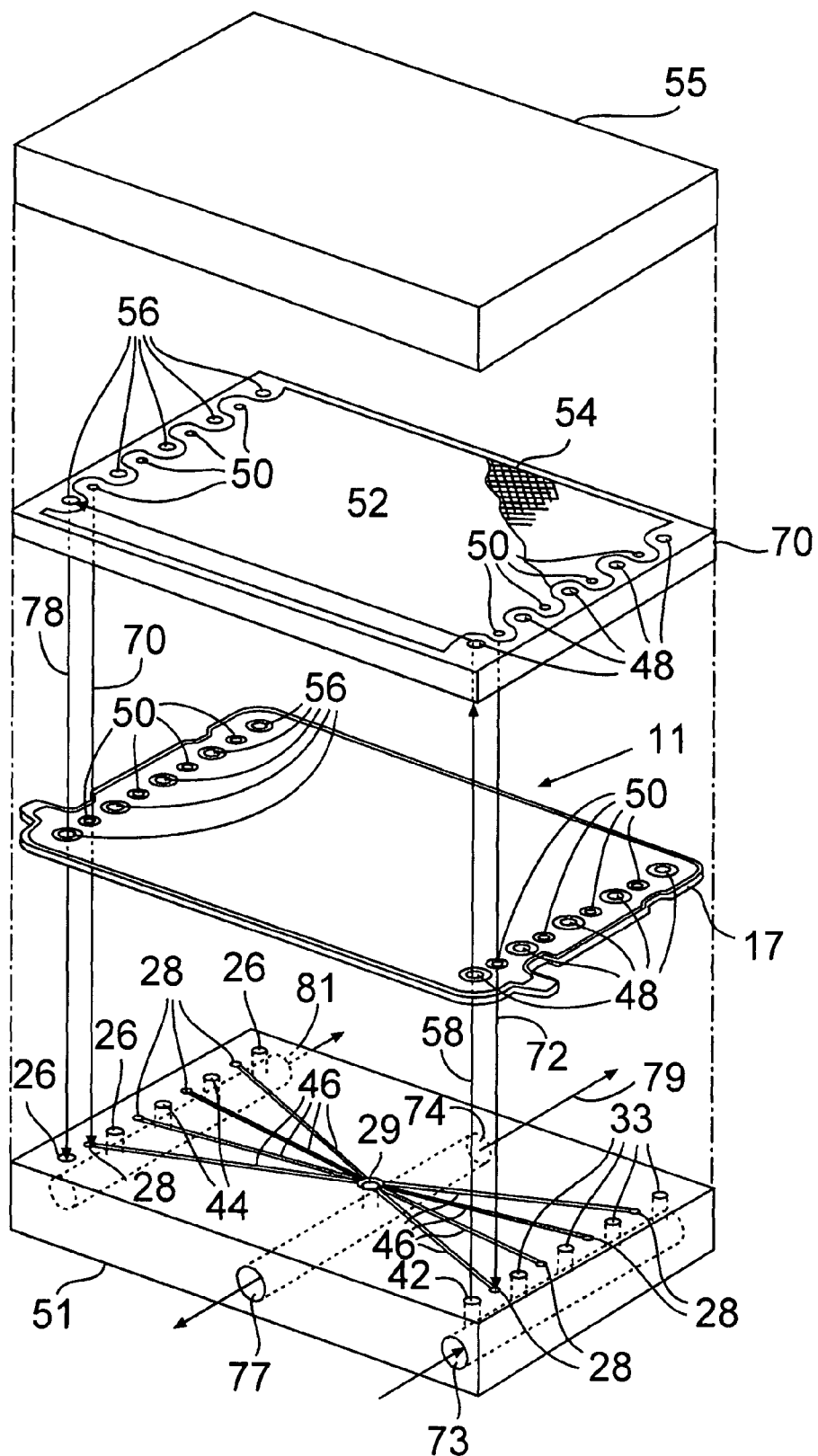
FIG. 6 is an exploded view of a filtration module manifold and the manifold adaptor plate with this invention.
Figure 7:
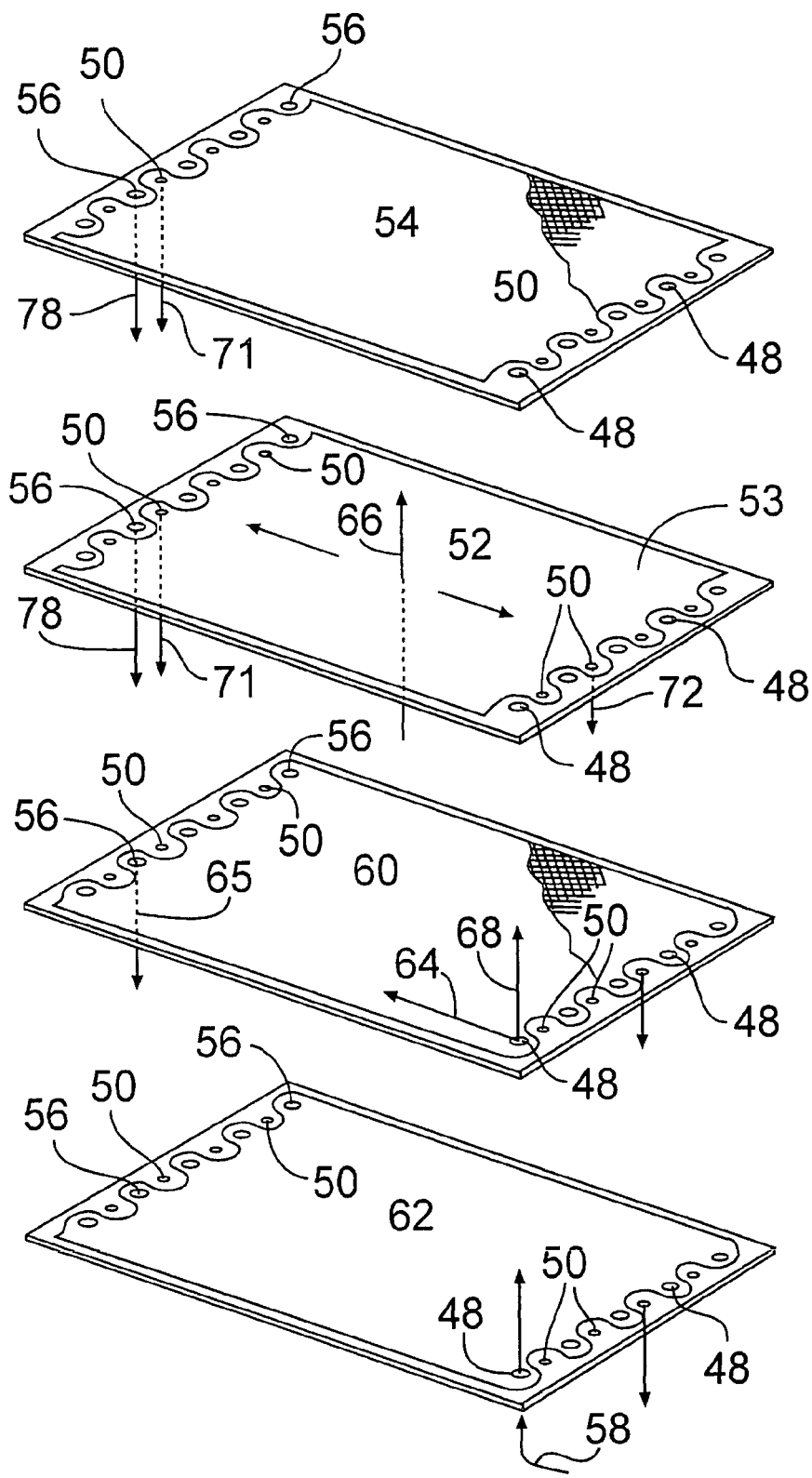
FIG. 7 illustrates the function of a filtration module suitable for use with this invention.

Referring to FIG. 6, a filtration module useful with the manifold adaptor plate of this invention is described. A filtration element 70 is positioned between manifold segment 51 and plate 55. Manifold segment 51 is provided with liquid inlet 73, filtrate outlets 77 and 79 and retentate outlet 81. The manifold segment 51 includes a plurality of feed inlet means 33 and a plurality of retentate outlet means 26. One set of filtrate outlet means 28 is provided on one end of the manifold segment 51 while a second set of filtrate outlet means 28 is provided on the opposite end of manifold segment 51. The filtrate outlet means 28 are connected to filtrate outlets 77 and 79 by filtrate conduit paths (grooves) 46 and filtrate outlet means 29. The paths 46 are of a size which permits filtrate to flow therethrough while avoiding sagging of a filtrate screen (not shown) into the paths 46, typically about 0.06 to 0.12 inch wide. The filtration module 70 includes holes 48 which communicate with feed inlet means 33 and holes 50 which communicate with filtrate outlet means 28. The manifold adaptor plate 11 (FIG. 2) is positioned so that the elastomeric layer 17 contacts manifold segment 51 so that proper sealing is effected which prevents admixture of filtrate with either feed or retentate. As seen in FIG. 7, the filtrate side 52 of the filter layer 53 having mesh spacer 54 in contact therewith is exposed. The filtration segment 70 is also provided with holes 56 which communicate with retentate outlet means 26. The plate 55 serves as a seal for the top surface of the filtration module 70.

Referring to FIG. 7, the filtration module 70 includes a filtrate spacer 54, a filter layer 52, a retentate spacer 60 and a filter layer 62 with a second filtrate spacer 54 (not shown) and which can contact paths 46. The liquid feed represented by arrow 58 passes through holes 48 in layer 62 into spacer 60. A portion of the liquid passes through spacer 60, as represented by arrow 64 and through filter 52 as represented by arrow 66. The remaining portion of the incoming liquid passes upwardly as represented by arrow 68, through holes 48 in filtrate spacer 54 and into the next adjacent filtration module (not shown) wherein it proceeds as described above with reference to filtration module 70. The filtrate passes into holes 50 and passes in a direction as shown by arrows 71 and 72 toward filtrate outlet means 28 (FIG. 6). The retentate passes across retentate spacer 60 as shown by arrows 64 and 65 through holes 56 and to retentate outlet means 26 (FIG. 6) in a direction as shown by arrow 78. The filtrate passes into holes 28, grooves 46, outlet means 29 (FIG. 6) toward filtrate outlets 77 and 79. The retentate passes through holes 26 and to retentate outlet 81.

Figure 8:
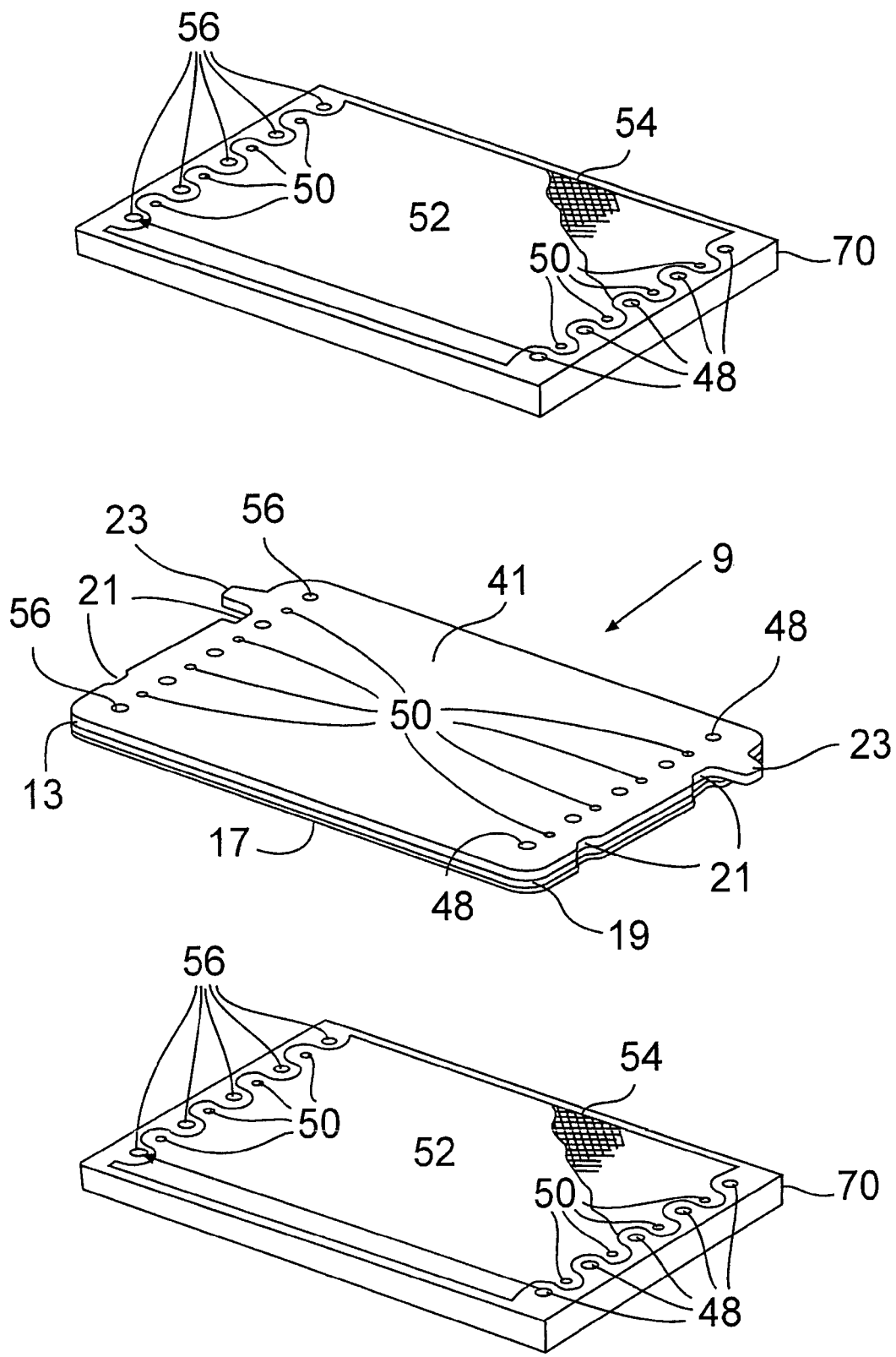
FIG. 8 is an exploded view of the manifold adaptor plate of the present invention and two filtration modules.

As shown in FIG. 8, the adaptor plate 9 (FIG. 4) is positioned between two filtration modules (FIG. 6) so that elastomeric layer 41 and elastomeric layer 17 provide the sealing function.

Referring to FIGS. 1, 6 and 7, the manifold apparatus 1 which utilizes the manifold adaptor plate 11 of this invention is utilized as follows: The liquid feed to be filtered passes into feed inlet 22 (FIG. 1), into liquid inlet 73 (FIG. 6), through feed inlet means 33, through feed inlets 48 and through filtration module 70 to separate feed into filtrate and retentate. Retentate is removed from filtration modules 70, through holes 56, through holes 26 and through outlet 81. Filtrate is removed from filtration modules 70 through holes 50, along paths 46 and through outlets 77 and 79.

Figure 9:
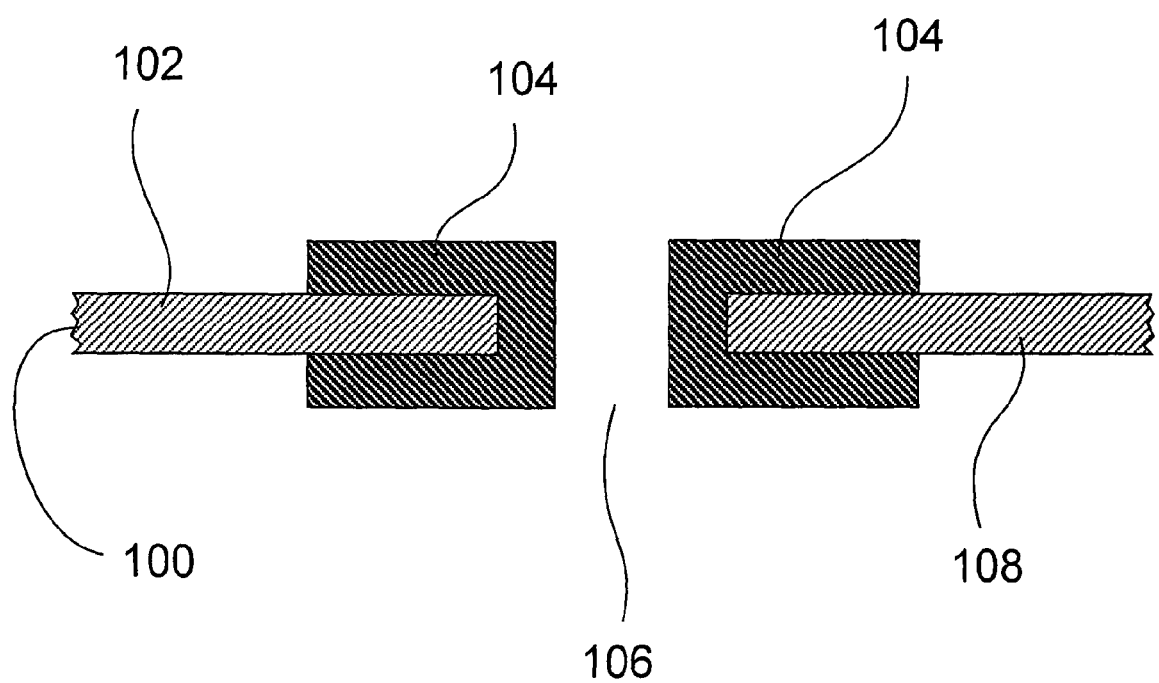
FIG. 9 is a partial cross sectional view of an alternative embodiment of the manifold adaptor plate of the present invention.

In a further alternative embodiment of this invention, the elastomeric layer is silicone-based and the polymeric layer is optionally eliminated. In one example of this embodiment as shown at FIG. 9, at least a portion of one side 102 of the rigid plate 100 is coated with the silicone layer 104 and the silicone layer 104 extends through the holes 106 formed in the rigid plate 100 to the opposite face 108 of the rigid plate 100 in order to form the seals on both sides of the plate 100. Alternatively, one may coat one side, both sides or the entire plate 100 if desired.

As silicone adheres to steel and some plastics such as polysulfone and polyethersulfone, the use of a polymeric sheet is not required with this embodiment, although if one wishes, one can do so. Additionally, as the silicone will in those instances adhere to the plate surface, the entire surface does not need to be fully encapsulated just those portions forming the seal or being exposed to the process stream, although the entire surface may be encapsulated if so desired.

In those instances in which the silicone does not naturally adhere to the plate surface, one may simply encapsulate the entire plate in silicone and rely upon the encapsulation to hold the silicone elastomer layer to the plate, Alternatively, one can surface treat the plate surface such as with plasma or oxidation or an adhering agent to enhance the adhesion of the silicone to the plate or one may use the polymeric layer described above.

When using stainless steel, particularly 316L stainless steel or other stainless steel grades or when using the plastics described above that are acceptable for fluid contact, one does not have to coat or encapsulate all of the surfaces of the rigid plate. Thus only the areas which form the seal in the system as well as the holes and the area around the holes on the other side need to be coated with the silicone.

Alternatively, both sides of the rigid plate can be coated with silicone without the need for the polymeric layer and the silicone layers are bound to each other through the holes formed in the rigid plate layer. This may be used with steel (stainless or not), plastic or composite rigid plates as described previously. It may cover just the two major surfaces or if desired it may encapsulate the rigid plate on all surfaces.

While a polymeric layer is not needed in these embodiments, due to either the adhesion of the silicone to the selected materials of the rigid plate or the encapsulation of the plate, it may be used if desired or if the material of the rigid plate is not a steel, or one of the selected plastics described above.

Suitable silicones include but are not limited to room temperature curable silicones, platinum cured silicones, light cured silicones, moistures cured silicones or heat cured silicones. An example of a suitable silicone useful in the present invention is a platinum cured silicone available from a number of suppliers such as Dow Corning Corporation (Silastic® silicone).

In a further embodiment of any the embodiments mentioned above, one can block or close off one or more of the holes in the plate with the elastomeric material to form a flow diverter. Generally, all the holes of at least one type (feed, retentate or permeate) or all holes (feed, permeate and retentate if used) are blocked. More preferably, the hole(s) are blocked by filling them with a volume of elastomeric or silicone material sufficient to prevent liquid flow through it.

Figure 10:
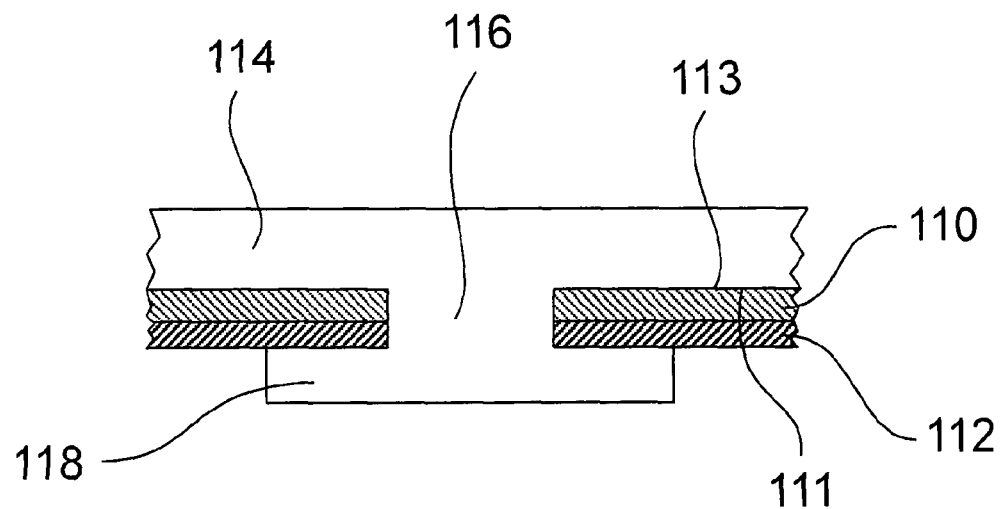
FIGS. 10 and 10A is a partial cross sectional view of an alternative embodiment of the manifold adaptor plate of the present invention.

In one embodiment of this design, as shown in FIG. 10, one uses a polymeric sheet 112 on a first major surface 111 of a rigid plate 110 and the elastomeric material 114 on the other major surface 113 and extending through the hole(s) 116 to overlay a portion 118 of the sheet 112 adjacent the hole(s) 116. The amount of elastomeric material used is sufficient to fill the hole(s) 116 and render it incapable of passing fluid from one major surface 111 to the other 113.

Similarly one can use the silicone embodiment without any polymeric sheet and block the hole(s) in a similar manner (not shown).

Figure 10A:
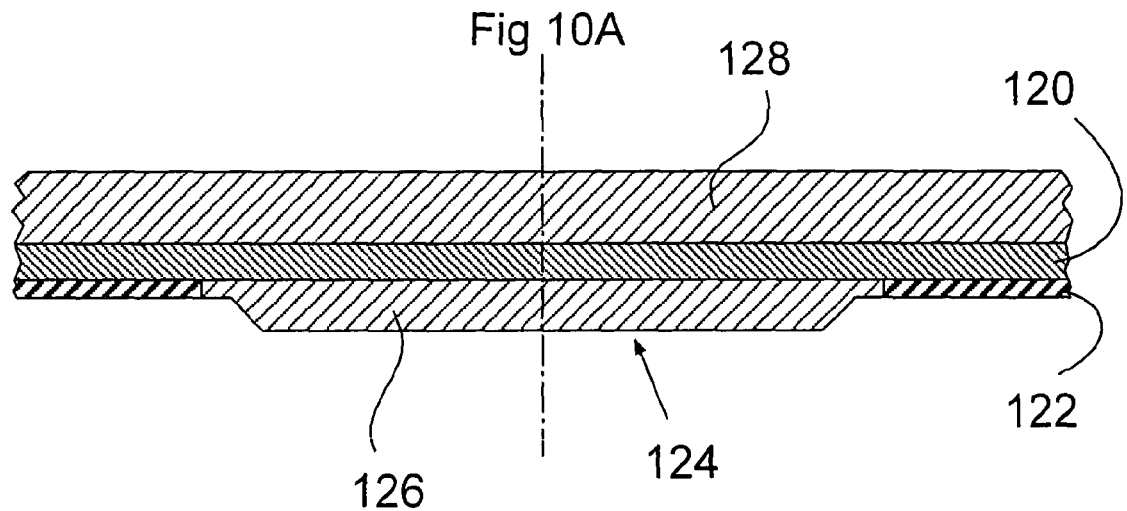

In FIG. 10A, is shown another embodiment in which the plate 120 is simply designed as a flow diverter and has no holes at least at those locations where the flow is to be diverted. The polymeric sheet 122 (if used) does have holes 124 and is attached to the diverter plate 120 by the use of the elastomeric material 126 in and around the holes 124 in the sheet 122. A sealing layer 128 is formed on the opposite face of the plate 120 as has been described above.

Similarly one can use the silicone embodiment without any polymeric sheet and cover just the areas of the plate corresponding to the where the holes should have been or the entire plate if desired in a similar manner (not shown).

What is claimed:

1. A manifold adaptor plate consisting essentially of a rigid layer having two major surfaces and having a plurality of liquid pathways therethrough to effect passage of a liquid therethrough, an elastomeric layer in contact with a first major surface of the rigid layer, and a polymeric sheet in contact with a second major surface of the rigid layer, said elastomeric layer extending through the pathways to seal the rigid layer in the pathways with the elastomeric layer and to bind the elastomeric layer to the polymeric sheet.

2. A manifold adaptor plate having a plurality of liquid pathways therethrough to effect passage of a liquid feed, a filtrate and a retentate consisting essentially of a first elastomeric layer formed on a first face of an intermediate rigid layer, the intermediate rigid layer being in contact with at least a portion said first elastomeric layer and having a plurality of liquid pathways therethrough to effect passage of a liquid therethrough, a first polymeric sheet between said first elastomeric layer and said rigid layer and a second elastomeric layer being bound to said first elastomeric layer through said liquid pathways and to seal the rigid layer with an elastomeric layer.

3. The manifold adaptor plate of claim 1 wherein said elastomeric layer is formed from a thermoplastic elastomer.

4. The manifold adaptor plate of claim 1 wherein said polymeric sheet is formed from polypropylene.

5. The manifold adaptor plate of claim 1 wherein said rigid layer is formed from stainless steel.

6. A manifold adaptor plate having a plurality of liquid pathways therethrough to effect passage of a liquid feed, a filtrate and a retentate comprising an elastomeric layer, an intermediate rigid layer having a first and a second major surface formed on opposite sides of the rigid layer and a polymeric sheet, said elastomeric layer being in contact with the first major surface of the rigid plate and the polymeric sheet being in contact with the second major surface of the rigid plate and the elastomeric layer extending through the liquid pathways to form protrusions that extend over and bind to polymeric sheet and seal the rigid layer with elastomeric layer.

7. The manifold adaptor plate of claim 2 wherein said elastomeric layer is formed from a thermoplastic elastomer.

8. The manifold adaptor plate of claim 2 wherein said polymeric sheet is formed from polypropylene.

9. The manifold adaptor plate of claim 2 wherein said rigid layer is formed from stainless steel.

10. The manifold adapter of claim 1 wherein the elastomeric layer is silicone.

11. The manifold adapter of claim 2 wherein the first and second elastomeric layer is silicone.

12. The manifold adaptor of claim 1 wherein the elastomeric layer is of a volume sufficient to close off one or more of the liquid pathways.

13. The manifold adaptor of claim 2 wherein the first elastomeric layers is of a volume sufficient to close off one or more of the liquid pathways.

14. The manifold adaptor of claim 1 further comprising tabs on two opposite sides of the intermediate layer.

15. The manifold adaptor of claim 2 further comprising tabs on two opposite sides of the intermediate layer.

16. The manifold adaptor of claim 1 further comprising a series of indentations on two opposite sides of the intermediate layer.

17. The manifold adaptor of claim 2 further comprising a series of indentations on two opposite sides of the intermediate layer.

18. The manifold adaptor of claim 6 further comprising tabs on two opposite sides of the intermediate layer.

19. The manifold adaptor of claim 6 further comprising a series of indentations on two opposite sides of the intermediate layer.

20. The manifold adaptor of claim 2 further comprising a second polymeric sheet positioned between said second elastomeric layer and said rigid layer.

21. A manifold adaptor plate having a plurality of liquid pathways therethrough to effect passage of a liquid feed, a filtrate and a retentate comprising an elastomeric layer wherein the elastomeric layer is made of a material selected from the group consisting of thermoplastic elastomer and silicone, an intermediate rigid layer having a first and a second major surface formed on opposite sides of the rigid layer, wherein the rigid plate is made of a material selected from the group consisting of steel, polysulfones and polyethersulfones, and a polymeric sheet, wherein the polymeric sheet is selected from the group consisting of polypropylene, polyethylene, polyester, polysulfone, polyamide, acetal, acrylic, polystyrene, PTFE and vinyl, said elastomeric layer being in contact with the first major surface of the rigid plate and the polymeric sheet being in contact with the second major surface of the rigid plate and the elastomeric layer extending through the liquid pathways to form protrusions that extend over and bind to polymeric sheet.

* * * * *